United States Patent [19]
Pykiet

[11] Patent Number: 5,469,686
[45] Date of Patent: Nov. 28, 1995

[54] COMPOSITE STRUCTURAL TRUSS ELEMENT

[75] Inventor: Kenneth L. Pykiet, Owasso, Okla.

[73] Assignee: Rockwell International Corp., Seal Beach, Calif.

[21] Appl. No.: 127,026

[22] Filed: Sep. 27, 1993

[51] Int. Cl.⁶ .................................................. E04C 2/34
[52] U.S. Cl. .................. 52/793.11; 428/116; 244/123
[58] Field of Search ............................... 52/782, 785, 790, 52/800, 807, 808, 7441.1, 745.18, 745.19; 428/116; 156/155, 173; 244/123, 124

[56] References Cited

U.S. PATENT DOCUMENTS

| | | | |
|---|---|---|---|
| 4,051,289 | 9/1977 | Adamson | 244/123 |
| 4,617,072 | 10/1986 | Merz | 428/116 X |
| 5,057,174 | 10/1991 | Anderson et al. | 156/155 |
| 5,128,192 | 7/1992 | Narasaki | 156/155 X |

*Primary Examiner*—Carl D. Friedman
*Assistant Examiner*—Creighton Smith
*Attorney, Agent, or Firm*—Terrell P. Lewis; Charles T. Silberberg

[57] ABSTRACT

A method for forming a structurally reinforced panel member, and the panel itself, is disclosed. The method requires disposing a first set of sheets of curable composite material atop a tool forming surface, wrapping a plurality of mandrels with a second set of sheets of curable composite material, arranging the wrapped mandrels in side by side relation atop the first set of sheets, curing the structural assembly, and then removing the mandrels from the cured structural assembly. In this way, the structural assembly includes interior channels obtained when the mandrels are removed from the cured structural panel member. The material portions defining the channels provide increased strength for the structural assembly.

14 Claims, 1 Drawing Sheet

COMPOSITE STRUCTURAL TRUSS ELEMENT

BACKGROUND OF THE INVENTION

1. Field of the Invention

The present invention relates to the fabrication of structural truss elements, and more particularly to a method for producing a truss element made of composite materials which is capable of performing structural functions.

2. Background Of the Invention

In the aerospace industry, composite materials are being used to form skin or panel structures. These materials lend themselves well to requirements that these structures exhibit high strength and, at the same time, minimal weight. Other requirements for such structures which have arisen in recent times include the ability to provide cooling or heat transfer functions, the ability to permit cooling and/or carry liquid or gas coolants, and the ability to reduce electronic visibility by fabrication from low dielectric materials.

Typically, the fabrication of such structures involves positioning several resin-impregnated sheets over a mold form, positioning core members or mandrels on top of the sheets, and thereafter disposing a plurality of layers of composite material sheets atop the mandrels. This assembly is then subjected to heat and pressure in an autoclave to cause curing of the resin in the composite material sheets.

A principal disadvantage of this process resides in the use of the mandrels, It has been found to be extremely difficult to remove such elements after curing has taken place. One of the most common reasons thwarting removal of the mandrels is that the composite material sticks to the mandrels.

It is against this background that the present invention has been developed.

OBJECTS OF THE INVENTION

It is therefore an object of the present invention to provide a method for making a composite panel member having internal chambers formed without the use of forming mandrels, where the method is capable of overcoming all the disadvantages and drawbacks of similar, currently Known methods for producing composite panel members.

Another object of the present invention is to provide a composite panel member having one or more internal channels which result when mandrels used In the lay-up phase of manufacture of the panel members are,removed after curing of the panel members.

Another object of the present invention is to provide a panel member and a method of manufacture therefor, where the panel member is capable of providing heat transfer functions, or structural functions, or both.

Still another object of the present invention is to provide a method for fabricating a composite panel or skin element having internal channels fabricated by disposing the composite material about mandrels prior to curing and then removing the mandrels following curing, as for example by a chem-milling process.

Yet another object is to provide a composite material truss core member having channels which facilitate cooling or heat transfer of the member or adjacent elements, or storage for electronic equipment or cables, and which further permits manufacture using a low dielectric material, such as a quartz or fiberglass, to minimize detectable electrical properties associated with configuration parameters.

DETAILED DESCRIPTION OF THE INVENTION

The present invention embraces a method for forming a panel or skin member principally capable of performing cooling functions and/or structural functions.

Figure 1:
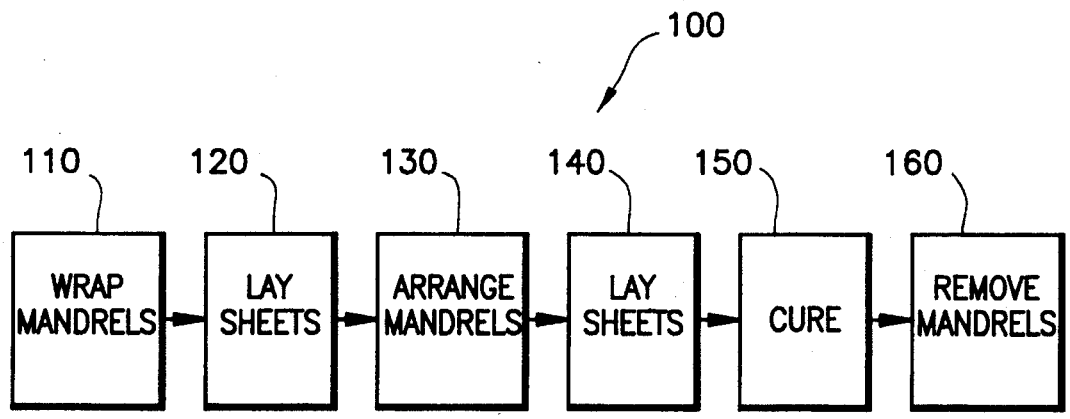
FIG. 1 is a flow chart showing schematically the steps of the method contemplated by the present invention.

Referring first to FIG. 1, there is shown a method for forming a panel or skin member having internal channels or chambers, where the member is capable of performing cooling functions and/or structural functions. The method 100 is depicted as a schematic flow chart essentially including six steps.

In step 110, composite material sheets are wrapped around extruded mandrels. In step 120, a second set of composite sheets is laid over a tool-forming surface. Step 130 entails arranging the wrapped mandrels side-by-side atop the second set of composite sheets. In step 140, another set of composite sheets is laid over the mandrels. In step 150, the layered assembly is cured, and in step 160, the mandrels are removed.

One preferred method of removing the mandrels from the cured assembly is by a chem-milling process.

Figure 2:
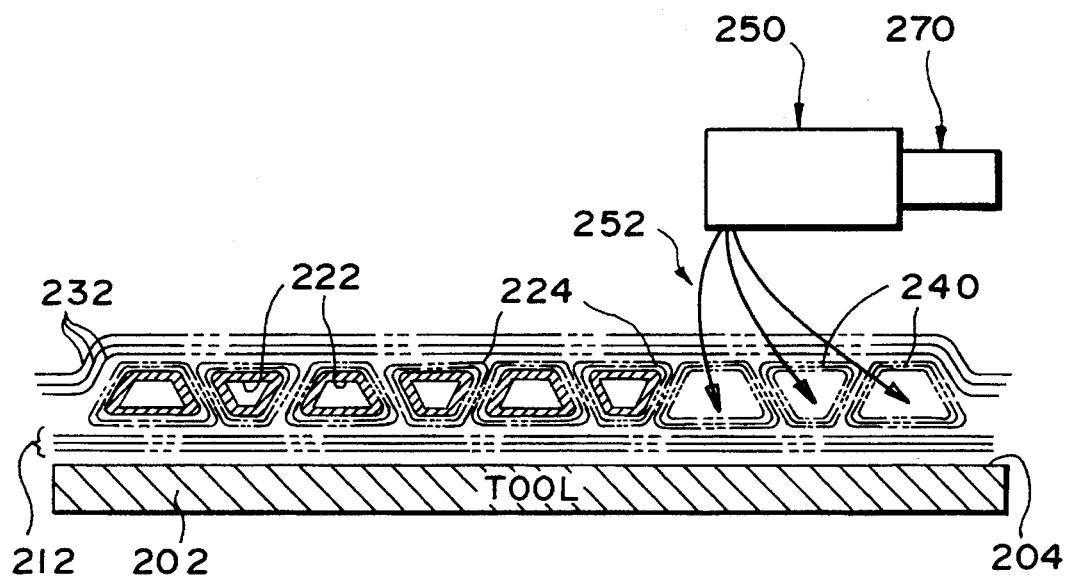
FIG. 2 shows the structural assembly which is obtained following the steps of the method of the present invention.

Referring now to FIG. 2, there is shown a forming tool 202 having a forming surface 204. A first plurality of sheets 212 of composite material is disposed atop the forming surface 204. A plurality of mandrels 222 are shown disposed atop the plurality of sheets 212, where the mandrels are disposed in side-by-side relationship. The mandrels are each wrapped with one or more sheets 224 of a curable composite material.

A third plurality of sheets 232 are shown to be disposed atop the sheet-wrapped mandrels. Sheets 232 are arranged atop the upper surface of the mandrels in such a manner as to define an upper skin of the uncured structural assembly.

The mandrels are preferably extrusions made of aluminum which are braided, filament wound or applied by fiber placement. Each of the mandrels is preferably wrapped three times (i.e., provided with three layers) of quartz prepreg material, which can exhibit thermoset or thermoplastic properties. The material can alternatively be impregnated with thermoset prepreg material. Each of the upper and lower plurality of sheets 212 and 232, respectively, can be of the same material as that which is wrapped around the mandrels.

After the structural assembly has been cured in an autoclave, the mandrels are removed, as shown at 240 in FIG. 2. The preferred process of removing the mandrels involves appropriately masking the structural assembly and chem-milling the aluminum mandrels out.

As has been described above, the present invention provides for a vehicle skin structure made of composite material which has a structural configuration that includes internal chambers or channels formed upon removal of the mandrels from the cured structure. These channels or chambers facilitate cooling of the skin structure by allowing the passage of liquid or gas coolants through the chambers or channels (Note in FIG. 2 a fluid source 250 that contains fluid 260 for delivery from the source through the tubular members 240, and a pump 270 fluidly coupled to the source). The channels are sealed to prevent coolant from penetrating the composite material skin structure. Care must be taken to also seal any manifolding extending from channel to channel to prevent leakage of the coolant from the interior of the skin structure.

Edges and moldline features are fabricated with a low dielectric material, eg. quartz-fiberglass, with no metal or high dielectric material used in designated low observable areas. The low observable areas are fabricated with Tedlar, a low dielectric material. The Tedlar is used to seal the channels when the latter is used for housing or conveying gas or liquid coolant.

Channel fabrication utilizes aluminum mandrels which can be sized and configured to meet structural, low observable and thermal requirements. The length of the aluminum mandrels must also be compatible with the panel size and coolant exposure length desired.

While certain representative embodiments and details have been shown for the purpose of illustrating the invention, it will be apparent to those skilled in this art that various changes and modifications may be made therein without departing from the spirit or scope of this invention.

What is claimed is:

1. A structurally reinforced panel member, comprising:
   a first layer of cured composite material,
   a plurality of discrete, elongated, tubular sections of cured composite material disposed side-by-side atop said layer,
   a second layer of cured composite material disposed atop said plurality of tubular sections,
   said first and second layer and said tubular sections of cured composite material being integrally formed as a unitary structure.

2. The structurally reinforced panel member of claim 1, wherein said tubular sections are arranged parallel to one another.

3. The structurally reinforced panel member of claim 2, wherein said tubular sections are disposed between said first and second layers.

4. The structurally reinforced panel member of claim 2, wherein at least two of said tubular sections are fluidly coupled to one another.

5. The structurally reinforced panel member of claim 1, wherein said discrete, elongated, tubular sections each comprise a substantially cylindrically shaped tube.

6. The structurally reinforced panel member of claim 4, and further including means for moving fluid through said tubular sections.

7. The structurally reinforced panel member of claim 6, wherein said fluid is a coolant.

8. The structurally reinforced panel member of claim 1, wherein one of said first or second layers of cured composite material is a vehicle skin which requires cooling, and said tubular sections define channels for carrying coolant to cool the aircraft skin.

9. The structurally reinforced panel member of claim 8, wherein the surfaces of said channels are sealed.

10. The structurally reinforced panel member of claim 9, wherein the material used for sealing the channel surfaces is Tedlar.

11. A method for forming a structurally reinforced panel member, comprising:
    arranging a first plurality of sheets of curable composite material atop a tool forming surface to form a first uncured face sheet member,
    wrapping a second plurality of sheets of curable composite material around each one of a plurality of tubular mandrels to form a plurality of wrapped tubular members,
    arranging said wrapped tubular members in side by side relationship adjacent one another atop said first uncured face sheet member,
    disposing a third plurality of sheets of curable composite material atop said wrapped tubular members to form a second uncured face sheet member, said first and second uncured face sheet members and said wrapped tubular members constituting a structural assembly,
    curing said structural assembly to unitarily connect the face sheets with the tubular members, and
    removing said mandrels from said cured structural assembly to yield a plurality of tubular elements arranged side by side between the two face sheets,
    said cured structural assembly including interior channels obtained when said mandrels are removed from said cured tubular members, the walls of said tubular elements providing increased strength for said structural assembly.

12. The method of claim 11, and further including the step of removing said mandrels from said cured structural panel member by a mechanical process.

13. The method of claim 12, wherein said step of removing the mandrels from said structural panel member includes a step of chem-milling said mandrels.

14. The method of claim 12, further including the step of fluidly coupling selected ones of said tubular elements.

* * * * *